US008827799B1

(12) United States Patent (10) Patent No.: US 8,827,799 B1
Brown et al. (45) Date of Patent: Sep. 9, 2014

(54) SOCIAL GAMING PLATFORM WITH REAL WORLD OUTCOMES

(71) Applicant: SocialBon, Inc., Lexington, KY (US)

(72) Inventors: Lincoln Brown, Lexington, KY (US); Alberto Escarlate, Westport, CT (US)

(73) Assignee: Socialbon, Inc., Lexington, KY (US)

( * ) Notice: Subject to any disclaimer, the term of this patent is extended or adjusted under 35 U.S.C. 154(b) by 0 days.

(21) Appl. No.: 13/655,639

(22) Filed: Oct. 19, 2012

Related U.S. Application Data

(60) Provisional application No. 61/550,263, filed on Oct. 21, 2011.

(51) Int. Cl.
*A63F 13/12* (2006.01)

(52) U.S. Cl.
USPC .................... 463/25; 463/40; 463/41; 463/42

(58) Field of Classification Search
CPC .............. A63F 13/12; A63F 2300/69; A63F 2300/695; A63F 2300/575; G07F 17/3225; G07F 17/323; G07F 17/3244; G07F 17/3262; G07F 13/3272; G06Q 50/01
USPC .............................. 463/25, 40–42; 705/14.12
See application file for complete search history.

(56) References Cited

U.S. PATENT DOCUMENTS

| | | | | |
|---|---|---|---|---|
| 7,236,943 | B1 * | 6/2007 | Heflin ........................ | 705/14.12 |
| 7,925,533 | B2 * | 4/2011 | Shaw et al. ................ | 705/14.17 |
| 2006/0178975 | A1 * | 8/2006 | Jung et al. ..................... | 705/35 |
| 2006/0190392 | A1 * | 8/2006 | Samid ............................ | 705/37 |
| 2006/0229976 | A1 * | 10/2006 | Jung et al. ...................... | 705/39 |
| 2007/0013692 | A1 * | 1/2007 | Jung et al. ..................... | 345/419 |
| 2007/0024613 | A1 * | 2/2007 | Jung et al. ..................... | 345/419 |
| 2007/0073582 | A1 * | 3/2007 | Jung et al. ...................... | 705/14 |
| 2008/0096665 | A1 * | 4/2008 | Cohen ............................ | 463/42 |
| 2009/0054152 | A1 * | 2/2009 | Tsiokos ......................... | 463/42 |
| 2009/0099969 | A1 * | 4/2009 | Hoeg et al. ...................... | 705/80 |
| 2011/0029363 | A1 * | 2/2011 | Gillenson et al. .......... | 705/14.15 |
| 2011/0086712 | A1 * | 4/2011 | Cargill ........................... | 463/42 |
| 2011/0264489 | A1 * | 10/2011 | Ganetakos et al. ............ | 705/12 |
| 2012/0047008 | A1 * | 2/2012 | Alhadeff et al. ........... | 705/14.16 |
| 2012/0179523 | A1 * | 7/2012 | Ganz ............................ | 705/14.7 |
| 2013/0052620 | A1 * | 2/2013 | Franklin et al. .............. | 434/236 |
| 2013/0053138 | A1 * | 2/2013 | Pereira et al. .................. | 463/29 |
| 2013/0260890 | A1 * | 10/2013 | Nuzzi et al. .................... | 463/42 |

OTHER PUBLICATIONS

Charity Game Goods [online]. Copyright 2010 [Retreived Dec. 13, 2013]. Retrieved from the Internet: <URL: http://charitygamegoods.com/index.php>.*

(Continued)

*Primary Examiner* — Dmitry Suhol
*Assistant Examiner* — David Duffy
(74) *Attorney, Agent, or Firm* — Fenwick & West LLP

(57) ABSTRACT

A social gaming platform provides information regarding real world projects that require funding to social gaming systems, which are presented to the social gaming systems' players. The social gaming systems also allow the players to play social games and accumulate virtual currency provided by a social gaming platform. The social gaming platform receives requests from players to fund the real world projects. The social gaming platform converts the virtual currency to a real currency (e.g., United States Dollars) based on revenues generated in association with the social games, and provides the real currency as funding to the projects according to the player's requests. The projects use the real currency to undertake the completion of the socially beneficial projects.

14 Claims, 9 Drawing Sheets

(56) References Cited

OTHER PUBLICATIONS

Eldon, Eric. Chase's Facebook Charity Donation App is Growing Like a Social Game [online]. Dec. 4, 2009 [retrieved Dec. 13, 2013]. Retrieved from the Internet: <URL: http://www.insidefacebook.com/2009/12/04/chases-facebook-charity-donation-app-is-growing-like-a-social-game/>.*

Geron, Tomio. Donate to Charity Playing Branded Games With GamesThatGive [online]. Apr. 28, 2011 [retrieved Dec. 13, 2013]. Retrieved from the Internet: <URL: http://www.forbes.com/sites/tomiogeron/2011/04/28/donate-to-charity-playing-branded-games-with-gamesthatgive/>.*

Linden, Kim. Support the Japan Earthquake & Pacific Tsunami Relief with Linden Dollars [online]. Mar. 11, 2011 [retreived Dec. 12, 2013]. Retrieved from the Internet: <URL: http://community.secondlife.com/t5/Featured-News/Support-the-Japan-Earthquake-amp-Pacific-Tsunami-Relief-with/ba-p/743743>.*

U.S. Appl. No. 13/236,513, filed Sep. 19, 2011, Inventors Lincoln Brown et al.

* cited by examiner

SOCIAL GAMING PLATFORM WITH REAL WORLD OUTCOMES

CROSS-REFERENCE TO RELATED APPLICATIONS

This application claims the benefit of U.S. Provisional Application No. 61/550,263 filed on Oct. 21, 2011 entitled "Social Gaming Platform with Real World Outcomes," which is incorporated by reference herein.

FIELD OF THE INVENTION

The present invention relates to online, multiplayer gaming systems and more particularly to social gaming systems.

BACKGROUND OF THE INVENTION

Social gaming systems are online gaming systems that operate in the context of online social networks. Social gaming systems make use of social networking infrastructure and social networking relationship information (e.g., the social graph) to promote the discovery, distribution, and game play of a social game by users of the social network. Most social games provide relatively simple fictional storylines to establish the game theme and introduce casual game play mechanics (e.g., the operations that the player must perform to obtain a goal in the game). Some social games rely on in-game advertising and on the purchase of virtual goods with the game to generate revenue for the game provider.

Social gaming is typically only rewarding to players in that it provides entertainment and a means for social interaction with other users and having fun. Notably though, existing social games do not directly produce socially beneficial, real world outcomes from the user's game play and participation in the game. While some social gaming systems donate revenues earned from the game towards such social causes, such outcomes are not related to the operation and structure of the social game or its supporting platform.

SUMMARY OF THE INVENTION

A social gaming system allows players to play social games and accumulate a philanthropic virtual currency (PVC) provided by a social gaming platform that interfaces with the social games. The social games are able to programmatically access the functions of the social gaming platform so as to determine the PVC value associated with activities in these games, and indicate an amount PVC to reward to players. The social gaming platform receives requests from players to fund real world projects affiliated with the social gaming platform. The social gaming platform converts the PVC to a real world currency (e.g., United States Dollars) based on received revenues, and provides the real world currency as funding to the affiliated real world projects according to the player's requests. The real world projects use the real world currency to undertake the completion of the socially beneficial projects in the physical real world.

The features and advantages described in this summary and the following detailed description are not all-inclusive. Many additional features and advantages will be apparent to one of ordinary skill in the art in view of the drawings, specification, and claims hereof.

Figure 1:
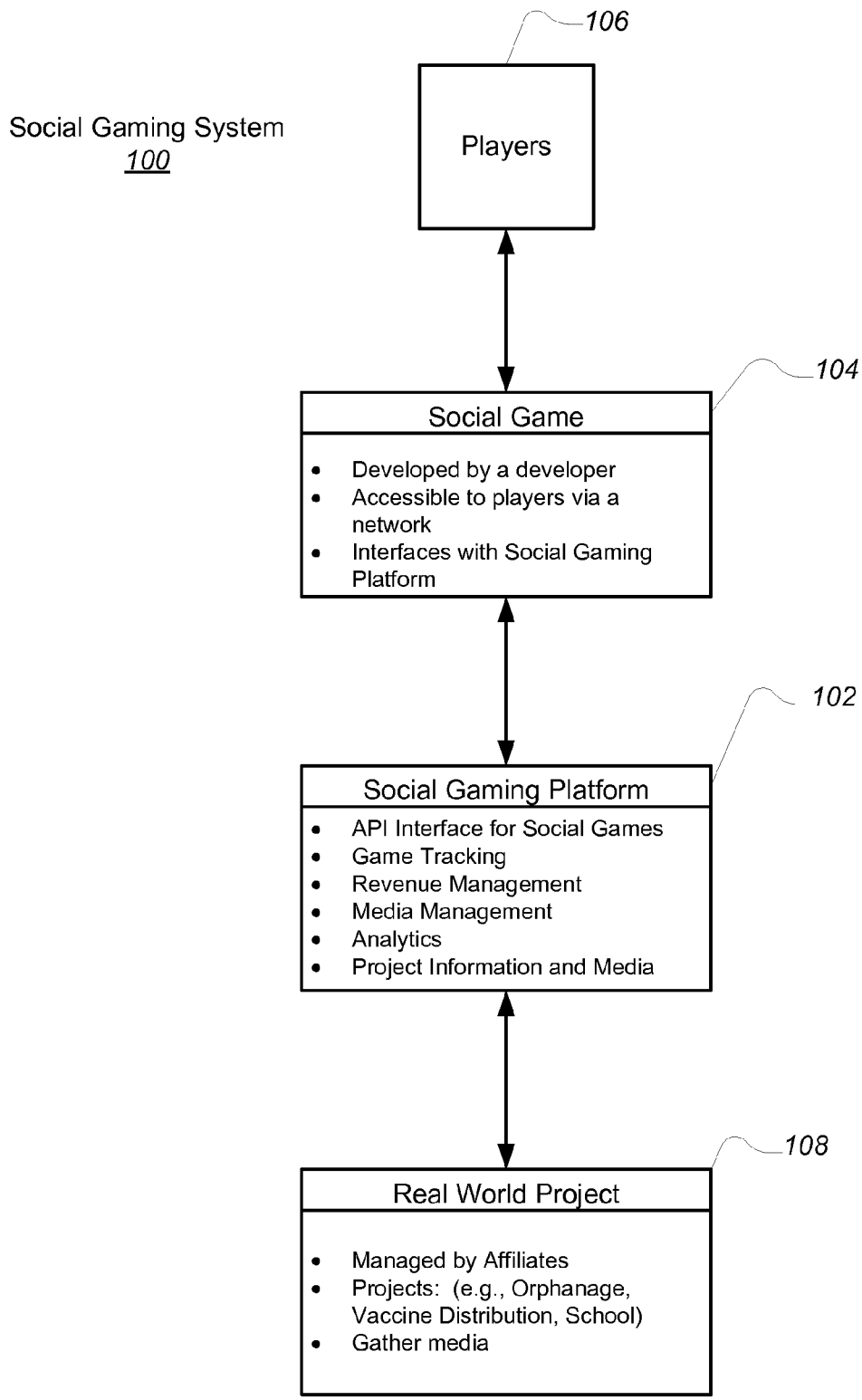
FIG. 1 is diagram of the organization of a social gaming system 100 that produces real world outcomes according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

The social gaming system 100 allows players 106 to play social games 104 and accumulate a philanthropic virtual currency (PVC) provided by a social gaming platform 102 that interfaces with the social games 104. The social gaming platform 102 receives requests from players 106 to fund real world projects 108 affiliated with the social gaming platform 102. The social gaming platform 102 converts the PVC to a real world currency (e.g., United States Dollars) based on received revenues, and provides the real world currency as funding to the affiliated real world projects 108 according to the player's 106 requests. The real world projects 108 use the real world currency to undertake the completion of the socially beneficial projects in the physical real world.

FIG. 1 is diagram of the organization of a social gaming system 100 that produces real world outcomes according to one embodiment. The social gaming system 100 includes players 106, social games 104, a social gaming platform 102, and real world projects 108.

Players 106 play social games 104 over a network, such as the Internet. The social games 104 can be accessed through, or embedded in, social network systems, such as Facebook™, MySpace™, Google+™, or the like, or may be provided on a standalone service or website. Players 106 access the social games 104 from client devices, such as computers, mobile phones, smart phones, internet-enabled televisions, or other access points to the network.

The social games 104 are video games played by players 106. Each social game 104 receives player input and provides game-related feedback to players 106 based on their input. The social games 104 are operated using networked computer systems, using one or more computers to store and transmit the data representing the gaming content and player information, and to execute computer programs providing the mechanics of the game operation. Developers of social games 104 are responsible for content and management of the game itself, for example the generation of game content, player interaction, player account management, and the like. The content for each social game 104 may be different, and does not have to be related, in terms of content, to the real world projects 108.

Social games 104 may also incorporate content from social network systems, for example lists of friends who are also players 106 of the game may be displayed in game, game play may be undertaken by multiple players 106 in a simultaneous, cooperative manner, players 106 may buy virtual goods for themselves or others using a social network system based currency, player actions may be reported as status or player profile information to the social network system.

While the social games 104 are typically developed by third parties unaffiliated with the social gaming platform 102, they can incorporate functionality exposed by a social gaming platform 102 by means of an application programming interface (API). All of the functional interactions and exchanges of information between the social games 102 and the social gaming platform are mediated by the API. Examples of functionality which may be provided by the social gaming platform include a philanthropic virtual currency (PVC) system for contributing to real world projects 108 affiliated with the social gaming platform 102, cross-game player tracking, revenue management tools for distributing PVC and deriving revenue from its use, media management for providing media related to real world projects 108 to social game 104 developers and players 106, and real world project 108 information lookup tools.

Philanthropic Virtual Currency (PVC)

The social gaming platform 102 provides a computer-implemented, programmatically controlled mechanism by which social games 104 can reward players 106 with a philanthropic virtual currency which players 106 earn through game play. Players earn PVC by performing various game related tasks, for example achieving in-game levels, spending an amount of time playing, interacting with in-game advertisements, purchasing virtual goods, and executing specific game mechanics defined by the game developers. The amount of PVC earned is generally at the discretion of the social game 104 developer, depending upon the amount of PVC they have available. Thus, each game 104 may allow players 106 to earn PVC in a different way. In some cases, PVC may be purchased by players 106 with real world currency. The amount of PVC a player 106 has accumulated can be used as a measure of influence a player 106 will be able to have on what real world projects 108 they want to help fund.

Earned PVC may be spent by players 106 to contribute to real world projects 108 that are affiliated with the social gaming platform 102. The social games can request and receive from the social gaming platform, a list of real-world projects 108. The social games then provide this list to the player, who can allocate the PVC they have earned. The social games provide this allocation information back to the social gaming platform 102, which then combines this information from the multiple different social games 104 to determine the specific real world funding to be given to each real world project.

The PVC is tied indirectly to a real world currency value. The aggregated requests of players 106 to spend PVC are processed by the social gaming platform 102 to determine, for each real world project 108, what proportion of total spent PVC within a particular time period has been allocated for each real world project. Described differently, by spending PVC a player 106 is providing their vote, weighted by the amount of PVC spent, regarding what proportion of total revenue should be given to each real world project 108. To determine the amount of real world currency revenue to donate to each real world project 108, the social gaming platform 102 takes the proportion of PVC spent on each real world project 108 and multiplies it against the total amount of real world currency revenue available for distribution to real world projects 108 for the particular time period.

Real world currency revenue is obtained by the social gaming platform 102 through the sale of PVC to social games 104, sales of virtual goods, sponsorships between social games 104 and the social gaming platform 102, sponsorships with outside organizations, advertising, social game 104 subscription fees, or developer specific monetization of the social game 104. Real world currency may also be obtained through pre-established revenue sharing agreements between owners of social games 102 and the owner of the social gaming platform 104. In one embodiment, the revenue sharing agreement between 102 and 104 may define the costs for philanthropic virtual goods (PVGs) and PVC served by 102.

The particular time period over which revenue is aggregated and distributed to real world projects 108 may vary. The particular time period may be daily, weekly, monthly, or a variable period depending upon when a threshold revenue target is met. In one embodiment, the amount of revenue to be distributed to real world projects 108 is based on a gross revenue received by the social gaming platform 102 minus operating expenses. Operating expenses may include, for example, transaction fees and server hosting costs, for example.

In one embodiment, each project gets a periodic, pro rata share $F_i$ of the total periodic revenue, the pro rata share equal to the project's pro rata share of the total PVC given that period. More specifically, the amount of revenue $F_i$ allocated to each real world project 108 is determined according to the function $$F_i = \frac{j_i}{J} \times P$$

where each project $Q_i$ will receive for that day the amount of funds $F_i$. Of a total of n available projects, each project $Q_i$ was given $j_i$ PVC by all players 106 during that time. The total J PVC for that day is calculated by:

$$J = \sum_{i=1}^{n} j_i$$

The calculation is repeated regularly (daily) until a project $Q_i$ receives the predetermined amount of funds specified to complete execution of the project 108.

Figure 2:
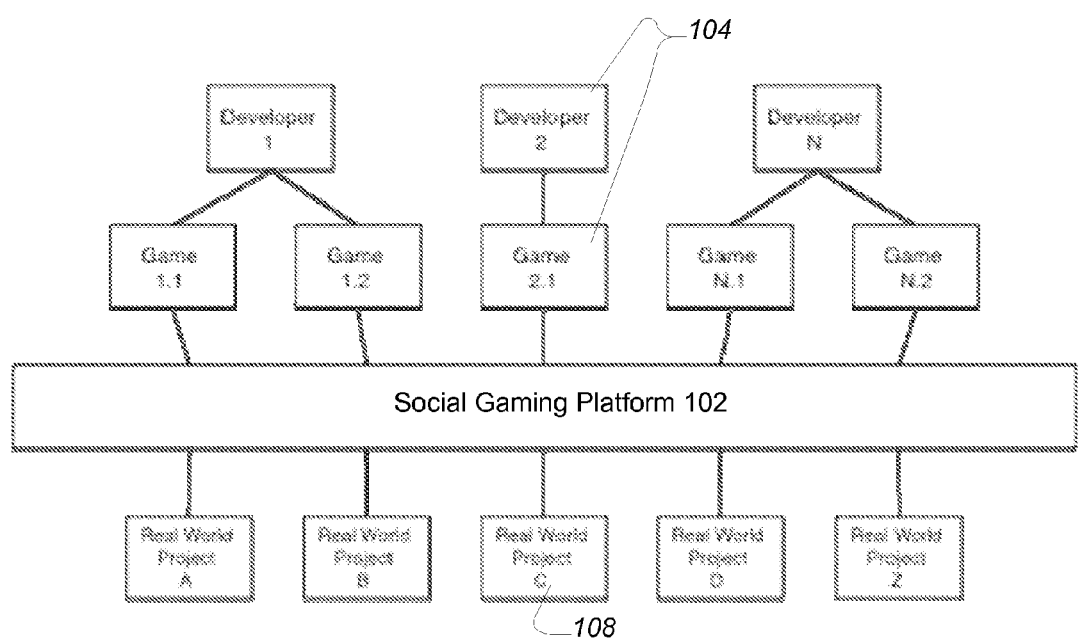
FIG. 2 is a diagram of the organization of a social gaming system illustrating the interaction between multiple developers, games, and real world projects according to one embodiment.

FIG. 2 is a diagram of the organization of a social gaming system 100 illustrating the interaction between multiple developers, games 104, and real world projects 108 according to one embodiment. The distribution of revenue to real world projects 108 based on PVC expenditures received by the social gaming platform 102 may occur in a number of different ways depending upon the relationship between the social games 104, the social gaming platform 102, and the real world projects 108. FIG. 2 illustrates one possible set of relationships, where multiple developers may each implement one or more social games 104 that interface with a single social gaming platform 102. The social gaming platform 102 has affiliations with many different real world projects 108. Players 106 may earn PVC in any social game 104 and spend PVC on any real world project 108 affiliated with the social gaming platform 102.

Other relationships are possible. For example, only one social game 104 may be affiliated with a social gaming platform 102, which in turn is affiliated with multiple different real world projects 108. In another example, several social games 104 all from a single developer are associated with a social gaming platform 102, which in turn is affiliated with multiple different real world projects 108, where each social game 104 is directly associated with its own real world projects 108. In this example, players 106 are constrained in that they may only spent PVC on real world projects 108 directly associated with each social game 104.

In another example, multiple social games 104 from multiple developers are associated with a social gaming platform 102, which in turn is affiliated with multiple different real world projects 108, where each social game 104, as immediately above, is directly associated with its own real world projects 108. In another example, individual developers, which may implement one or more social games 104 each, may have their own real world projects 108 which the players 106 of their social games 104 may choose between to spend PVC on. In this example, players 106 may not spend PVC on the real world projects 108 associated with other developers.

To be able to provide PVC to players 106, social games 104 purchase PVC from the social gaming platform 102. This prevents social games 104 from inflating the value of PVC by over-distributing it to players 106 relative to other social games 104. The cost of PVC may be defined by volume or based on real world projects 108 affiliated with a developer or with a social game 104.

Social Gaming Platform Application Programming Interface

The social gaming platform 102 comprises a secure application programming interface (API) to allow the social games 104 to access the functionality of the social gaming platform. The API is a computer server application that exposes a number of software functions that may be called by social games 104. All transactions between a social game 104 or developer and the social gaming platform 102 are made through the API by calling functions made accessible by the API. All function calls are established between developers and/or social games 104 that are pre-approved and registered with the social gaming platform 102. To protect the API from abuse and corruption, all calls are timestamped and cryptographically signed. Each developer has a unique secret key that is used to sign all requests. Examples of functions from the API are as follows.

A function called get_pvc (developer, game, count) allows a social game 104 to purchase an amount of PVC from the social gaming platform 102 to be distributed to players within the social games 104 they have created or are responsible for. This function includes a financial transaction where the cost for the PVC is debited from a developer's account. Typically, developers are invoiced monthly where all purchases of PVC are described and detailed.

A function called check_pvc (developer, game) allows a developer to obtain their PVC balance for a particular social game 104. If only the developer parameter is passed in, then the total PVC balance for the developer is returned.

A function called allocate_pvc (project, amount) spends an amount of PVC on a particular real world project 108. The function is called by a social game 104 when a player 106 requests that earned PVC be spent as indicated. The social gaming platform 102 deducts the amount of PVC spent from the developer's PVC balance for the social game 104 (or alternatively from the developers total PVC balance for all social games 104). The social gaming platform 102 then increments the current PVC count $j_i$ for the project $Q_i$.

A function called player_pvc (player, amount) increments or decrements the amount of PVC in a player's 106 account based on their expenditures and earnings. When the player 106 earns PVC from a social game 104, for example through game play, the social game 104 calls the function to increment the player's PVC balance. When the player 106 spends PVC, the function is called to decrement based on the amount of the expenditure. By separately tracking PVC, a player's earned PVC may be utilized across different social games 104 provided by multiple different developers.

A function list_projects (developer, game) returns a list of real world projects 108 that players 106 of developer's games or a social game 104 in particular may spend PVC on. The details returned may include, for example, project name, project category, the NGO responsible for the project, the NGO's logo, the NGO's website URL, a total budgeted cost, media from the progress towards or completion of the project, project descriptive text, project status (e.g., in funding, funded, in execution, completed), current funding level, and percentage completion of the project. The list of projects is displayed to the player within the game, so that player can choose which project(s) to fund with the PVC they've earned.

A function project_details (project) returns information regarding real world project 108. The information may include, for example, project metadata and project related media. The information is transmitted in the form of a data structure including a chronologically sorted list of events. Example events include a time stamp, an event description, event details, event pictures, and event video. The detailed information is provided to the player from within the social game 104, for example on a detail page for the project.

Additional Social Gaming Platform Features

The social gaming platform 102 may further provide support for player tracking independent of any tracking performed by developers or their respective social games 104, or tracking performed by social network systems associated with the social games 104 or the social gaming platform 102. The tracked information may comprise of player 106 game play information, PVC spending histories, and social media content posted regarding the games or the real world projects 108, for example. The tracked information may be provided to developers, in the form of either statistics regarding individual player 106 behavior, or in the form of analytics regarding aggregate use of social games 104 and PVC by players 106. In one embodiment, player information is obtained by adding inputs to the player_pvc function described above. Additional inputs may include the name or identification of the player requesting that joy be spent and the timestamp of the request.

Figure 6A:
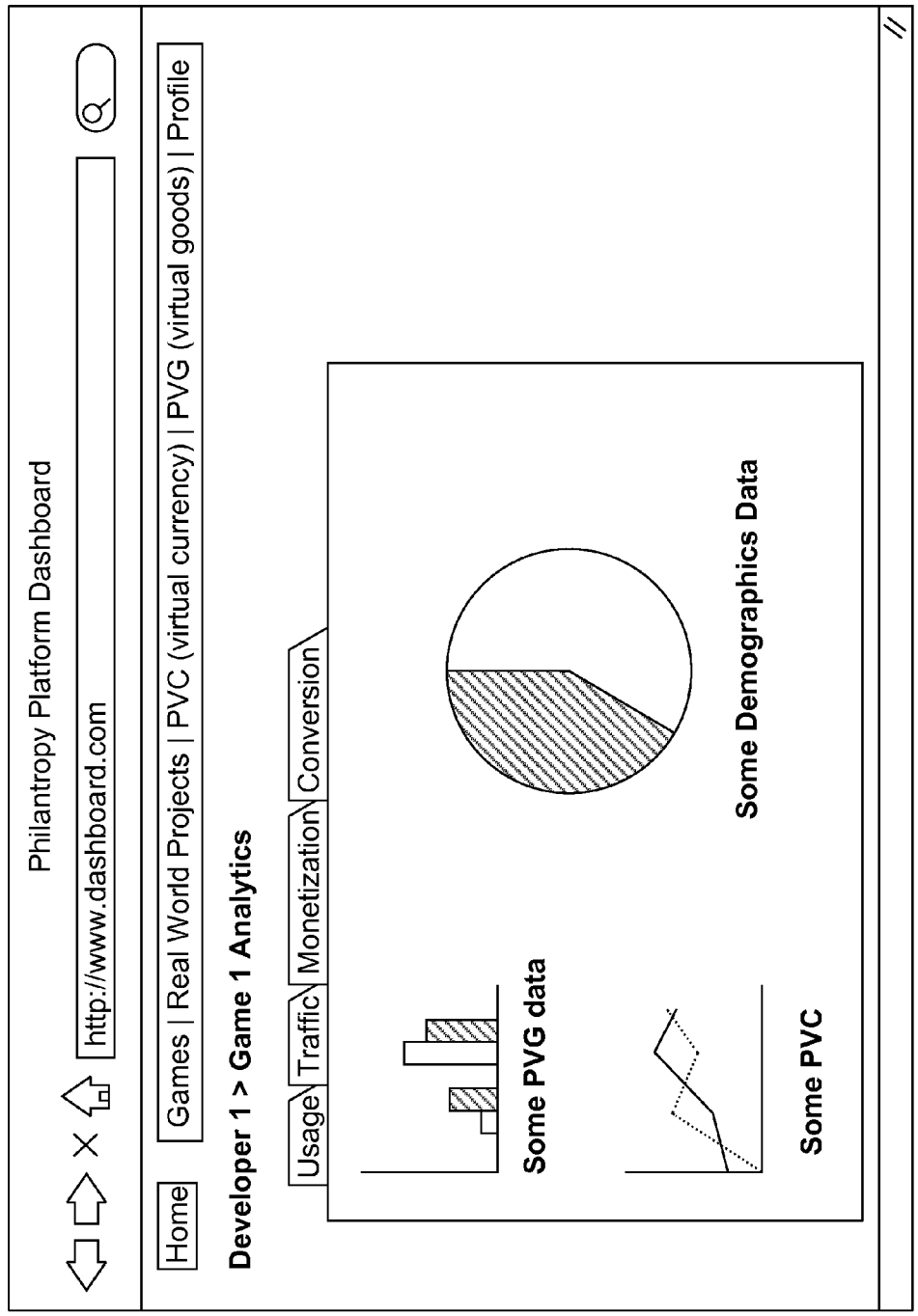
FIG. 6A is a screenshot of a developer dashboard illustrating graphical depictions of collected data, according to one embodiment.

The social gaming platform 102 also provides developers with an interactive dashboard (e.g., a user interface) so that they may monitor and alter their relationships with the social gaming platform 102 and real world projects 108. The dashboard allows them to monitor and update their PVC balance and bank account information and obtain analytics regarding individual and aggregate player 106 activity. The dashboard may also be used by developers to analyze the performance of their social games 104 to assist them with improving their games and increasing their uptake and use. The dashboard may provide information on, for example, daily active users (DAU), monthly active users (MAU), average revenue per user (ARPU), average revenue per paying user (ARPPU), average revenue per game, most valuable virtual goods, player churn, general demographics, peak playing times. FIG. 6A is a screenshot of a developer dashboard illustrating graphical depictions of collected data, according to one embodiment.

Figure 6B:
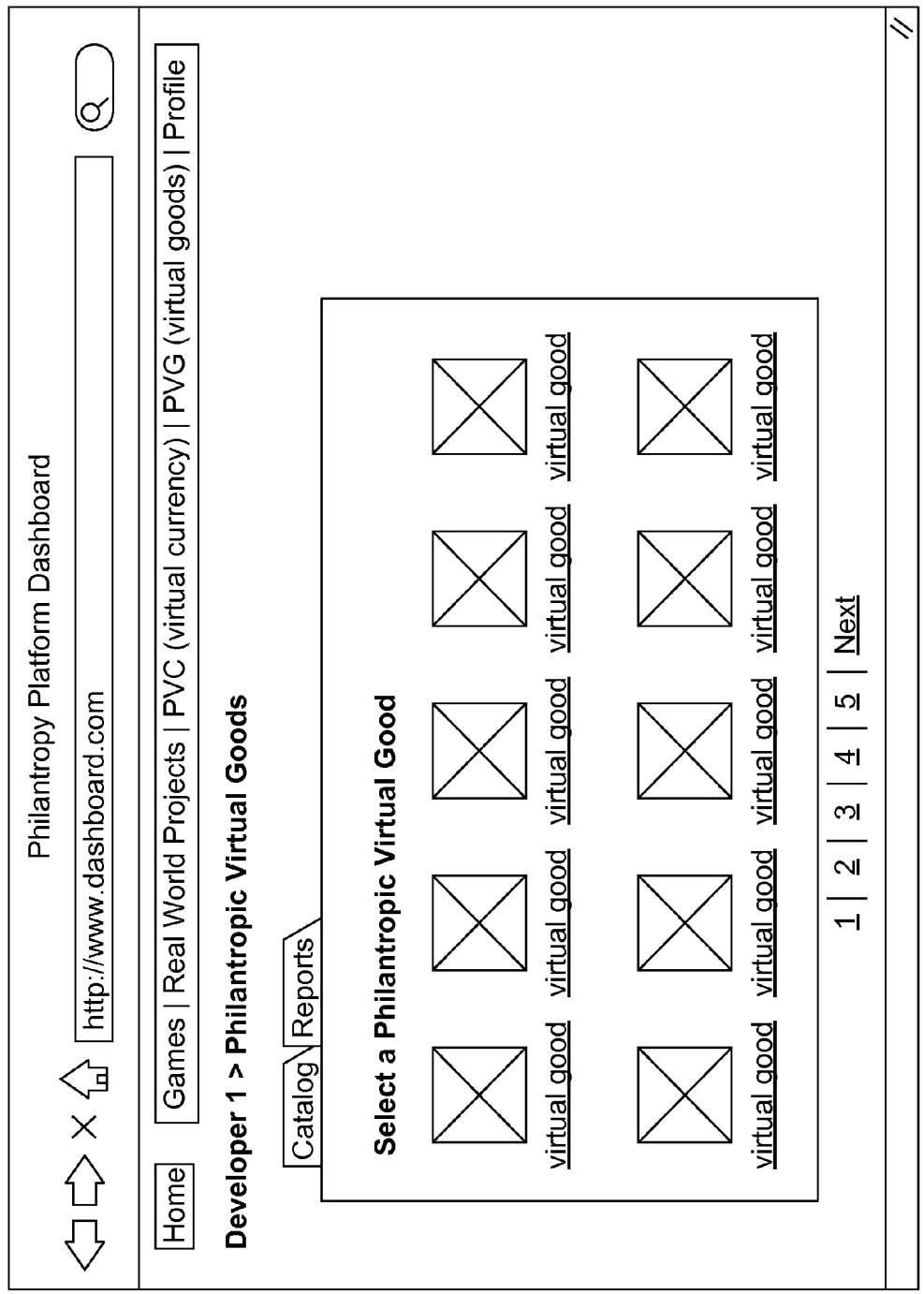
FIG. 6B is a screenshot of a developer dashboard illustrating available philanthropic virtual goods, according to one embodiment.

The dashboard also allows developers to control the sale of virtual goods that may be offered by the social gaming platform 102, possibly in conjunction with real world projects 108. Virtual goods may be sold inside social games 104 themselves, or externally by developers or the entity managing the social gaming platform 102. The dashboard also allows developers to control the placement of advertisements inside social games 104 by the social gaming platform 102. FIG. 6B is a screenshot of a developer dashboard illustrating available philanthropic virtual goods, according to one embodiment.

Figure 6C:
FIG. 6C is a screenshot of a developer dashboard illustrating real world project information, according to one embodiment.

The dashboard further allows developers to obtain information regarding real world projects 108. The information includes descriptive media for a real world projects 108, so that a developer can decide whether or not to include a given real world project 108 as a potential recipient for player's 106 spent PVC. The dashboard allows developers to add or remove real world projects 108 as recipients of PVC from players 106. The ability of players 106 to spend PVC on a real world project 108 may be controlled at the individual social game 104 level by a developer. FIG. 6C is a screenshot of a developer dashboard illustrating real world project information, according to one embodiment.

The dashboard also allows developers to view and obtain media related to the real world projects 108 for inclusion in social games 104 or for distribution directly to players 106. Social games 104 are further configured to make function calls of the social gaming platform's 102 API to request and receive media regarding real world projects 108. By receiving media regarding the real world projects 108 and presenting it to players 106, the social games 104 can reinforce to players 106 the real-world consequences of player's PVC contributions. The media allows players to closely follow the real world progress towards completion of real world projects 108 that they have spent PVC on.

Media regarding the real world projects 108 may be from any stage of the real world project 108, for example prior to initiation, during the process of completion, or after completion. Examples of types of media include photo diaries, video footage, blogs, interviews, audio recordings, letters, and press releases from affiliates involved completion of the real world project 108.

Developers of social games 104 may decide how to make media content available to players 106. For example, generally at least some media will be freely available to players 106 and non-players alike, in order to entice them to play the game. Developers may also choose to restrict some media to players 106 who have contributed varying amounts of PVC to encourage contributions. In other cases, media may be provided as projects are completed, as completions of real world project milestones may occur after contributions by players 106 have been made.

The social gaming platform 102 is also configured to provide a dashboard for affiliates managing real world projects 108 to receive funding and provide feedback, in the form of media, on the progress and completion of real world projects 108. The affiliates managing the real world projects 108 receive funds from the social gaming platform 102 based on revenue and spent PVC. Affiliates may use the allotted revenue to complete the real world projects 108 directly, or alternatively they may direct the execution of the real world projects 108 to third parties. The affiliates provide a number of benefits that assist in the completion of the real world projects 108, for example human resources, such as project administration and workers; capital resources, such as tools and infrastructure; and know-how, such as technical expertise, government relationships, access to specialists, and bureaucratic capabilities.

The affiliates responsible for the real world projects 108 use the dashboard to manage their real world projects with respect to the social gaming platform 102. The dashboard provides a mechanism for affiliates to add new real world projects 108 to the social gaming platform. To add a new project 108, the affiliate inputs the media describing the project 108 so that developers may decide whether to allow players 106 to spend PVC on the project 108. Each real world project 108 also has a funding goal that has been established by the affiliate. The funding goal is an amount of revenue to be allotted by the social gaming platform 102 based on PVC expenditures to ensure sufficient funding to undertake and complete the real world project 108 in the real world.

The social gaming platform 102 is connected to real world projects 108 that are sponsored by affiliates. The affiliates are responsible for overseeing the real world project 108 itself. The affiliates are responsible for the people working on to implement the real world projects, from the contractors, project managers, and vendors involved in the project to the citizens of the areas affected by the problems that are sought to be solved. The affiliates also gather media regarding the progress and completion of the real world projects 108 to improve the connectivity to the players 106, so that they are vested in the outcome of the projects they help create. The media can be reported in a variety of formats including, for example press releases, RSS feeds, audio or video clips, or pictures.

Figure 3:
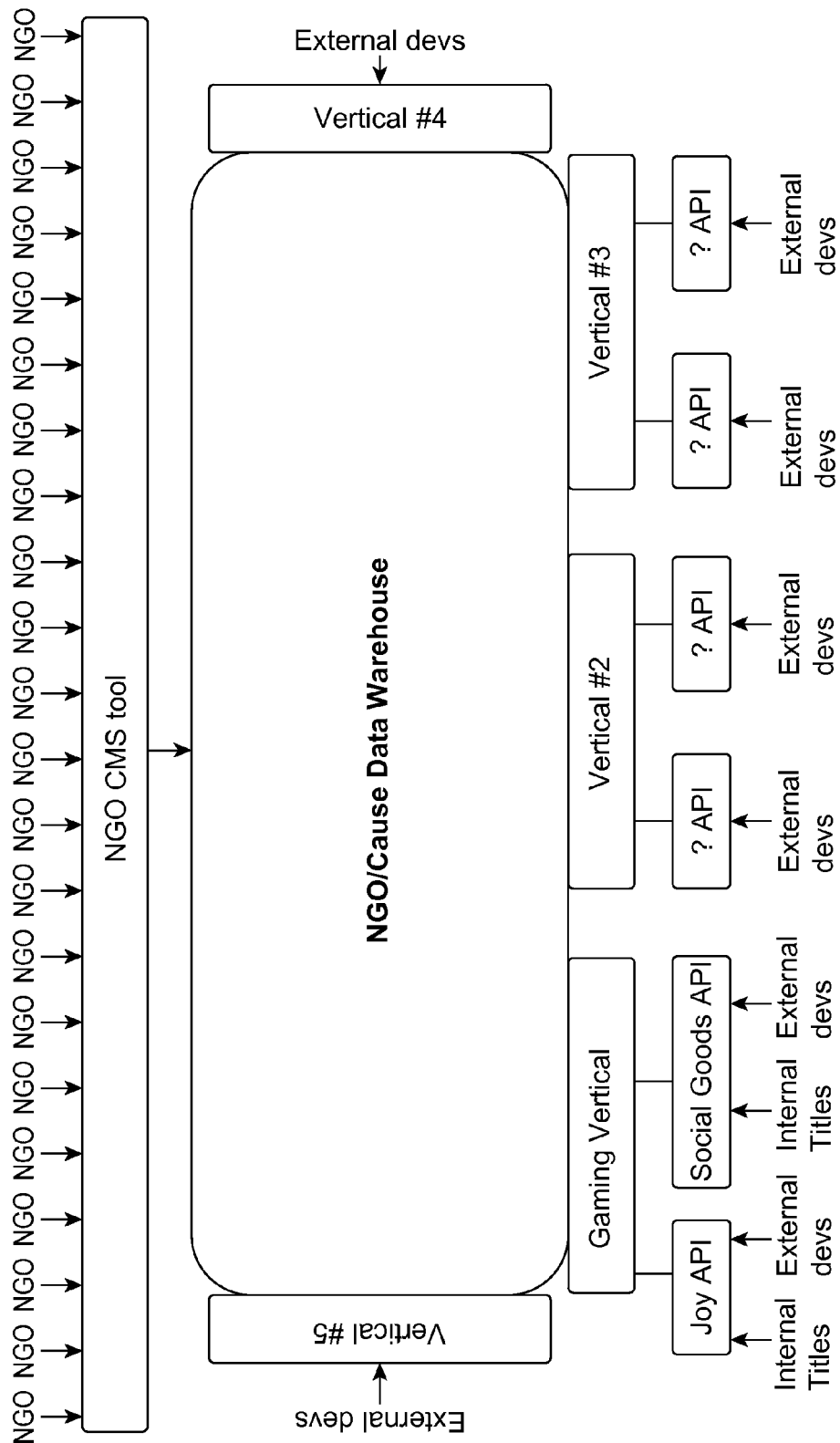
FIG. 3 is a diagram of the organization of a social networking system of which a social gaming system is just one part, according to one embodiment.

FIG. 3 is a diagram of the organization of a social networking system of which a social gaming system is just one part, according to one embodiment. In the example embodiment of FIG. 3, the social gaming platform 102 supports more than just social games and an associated API (e.g., the "Joy API") for interfacing with social games 104. The social gaming platform 102, supports a number of different verticals, where social gaming one of many possible verticals. Each vertical may include its own associated API that allows programs to interface the social gaming platform 102. The programs accessing the social gaming platform 102 include external programs written by third party developers, as well as internal programs (or titles) written by the owner of the social gaming platform 102. Due to the more general nature of the social gaming platform 102 in this example, the social gaming platform 102 may be referred to as a non-governmental organization (NGO)/Cause Data Warehouse as illustrated in FIG. 3. Real world projects 108 and their affiliates may access the warehouse through an NGO content management system (CMS) tool that includes at least all the tools described with respect to the social gaming platform 102 above. In some cases, programs of specific types of verticals may access the warehouse directly.

Social Game Example and Philanthropic Virtual Goods

Figure 4A:
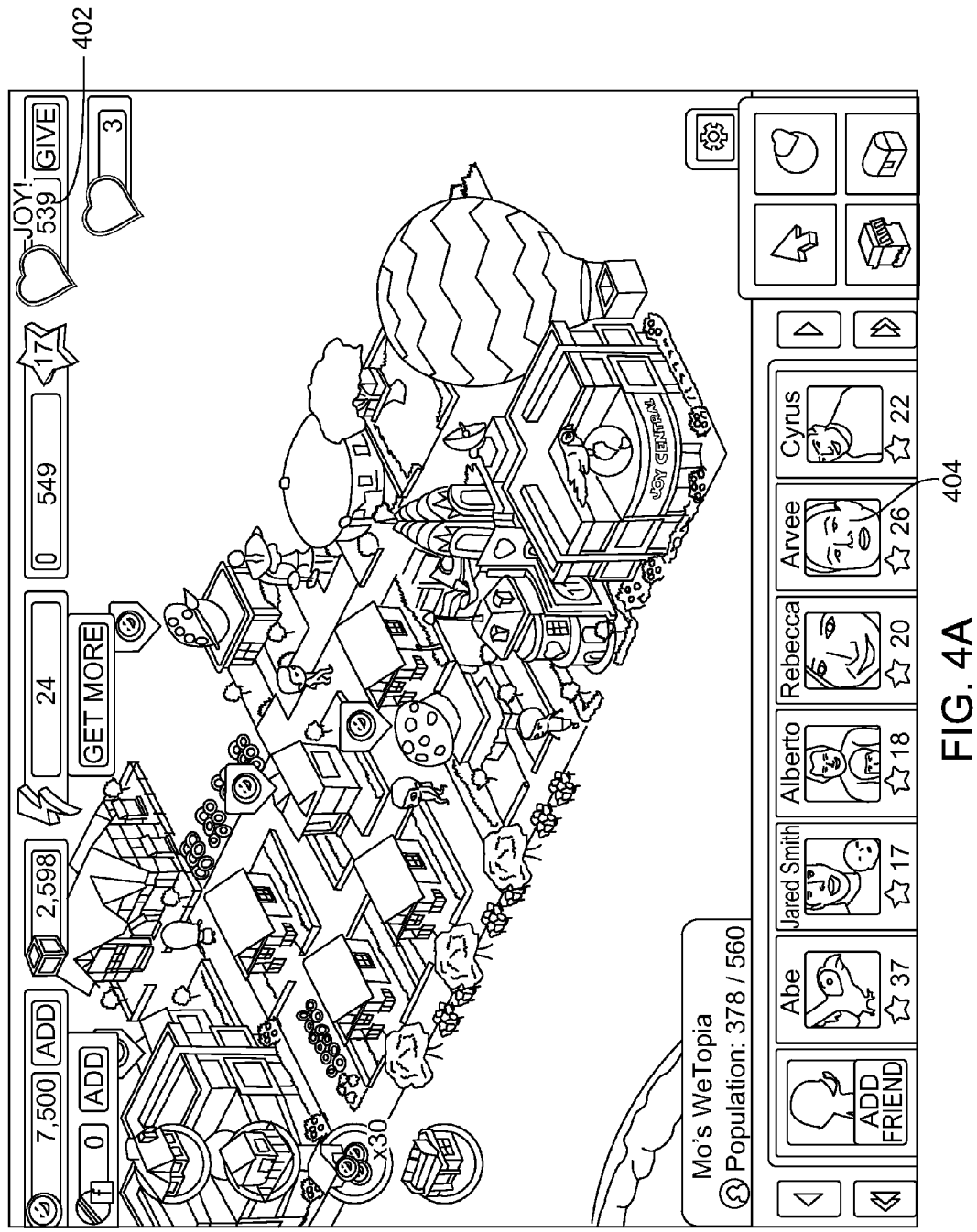
FIGS. 4A and 4B are screenshots of a social game incorporating the philanthropic virtual currency in game play, according to one embodiment.
Figure 4B:
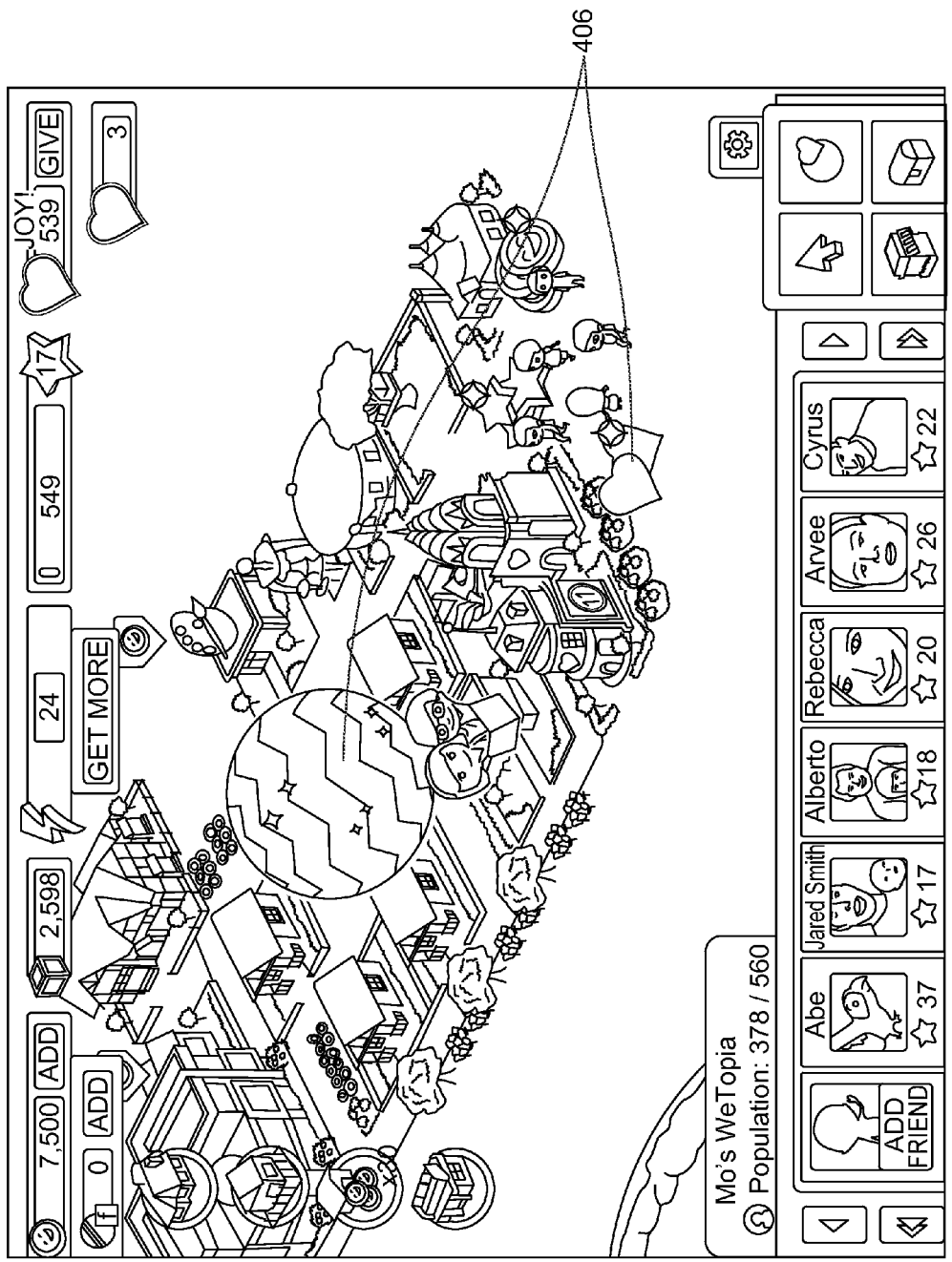

FIGS. 4A and 4B are screenshots of a social game incorporating the philanthropic virtual currency in game play, according to one embodiment. The social game 104 illustrated is merely exemplary of a game that may incorporate social gaming platform 102 features. In one embodiment, a social game 104 operates as described in U.S. patent application Ser. No. 13/236,513, filed on Sep. 19, 2011, the subject matter of which is incorporated herein by reference in its entirety.

In the social game of FIG. 4A, the social game 104 has a user interface element 402 displaying to the player 106 the amount of PVC they have earned which they may spend on real world projects 108. The social game 104 also includes user interface elements displaying information 404 regarding other players 106 of the social game 104 who are connected with the player 106. FIG. 4A illustrates a social game 104 prior to receiving an input from the player 106 to spend PVC on a real world project 108.

FIG. 4B illustrates the social game 104 after the player 106 has spent PVC on a real world project 108. The social game 104 responds to the player's 106 expenditure of PVC by altering the social game's 104 behavior. For example, in some embodiments expenditures of PVC may provide in-game advancement. In other cases, PVC expenditures may purchase virtual goods that may be used in game. In the example of FIG. 5B, the player's 106 avatar is carried off in a balloon 406 Woohoo!!! and the player's actions are affect the game play of the social game 104 in the form of icons 406 that have an effect upon future game play, for example cartoon hearts 406.

Figure 5:
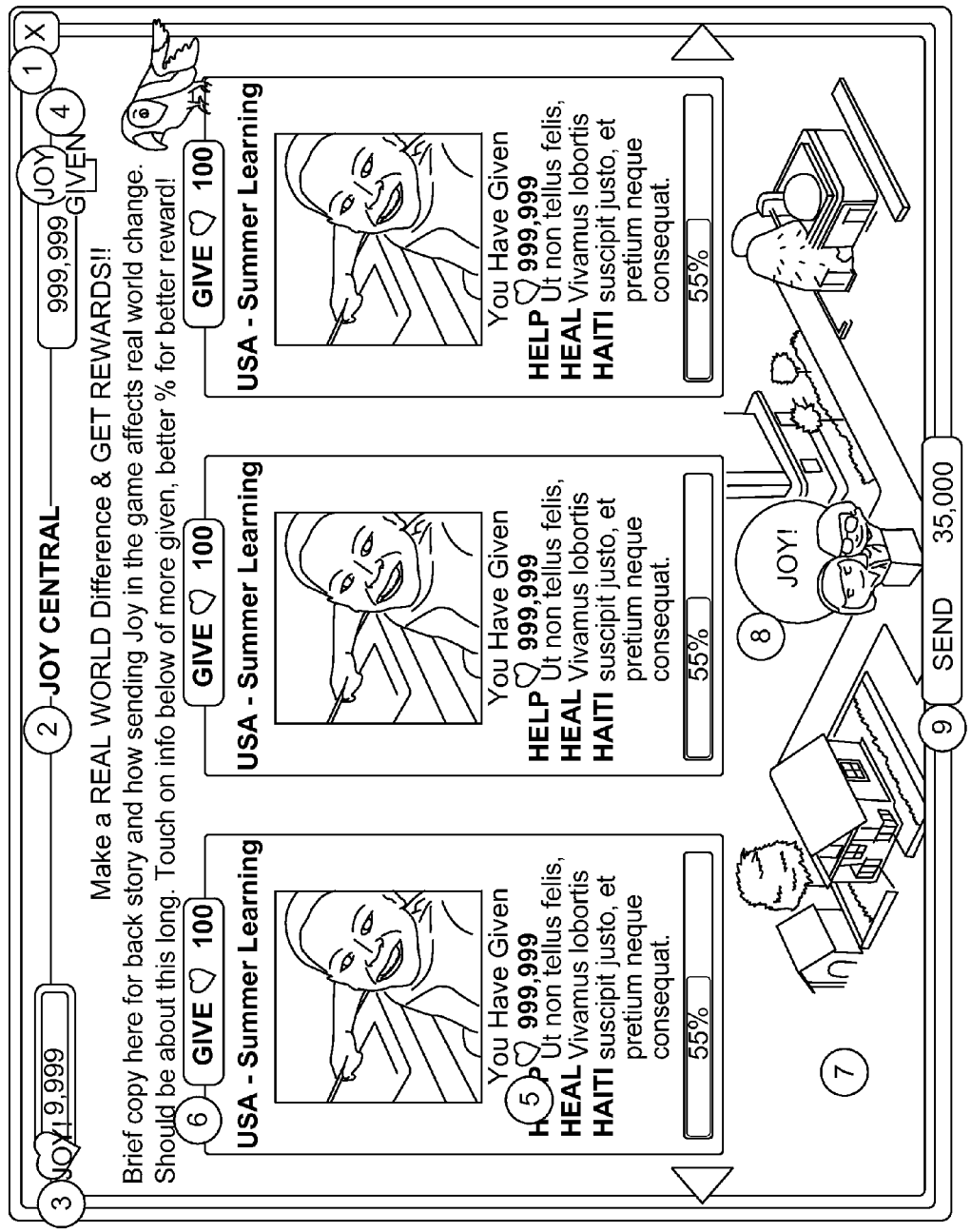
FIG. 5 is a screenshot of a social game where the player may choose how to award philanthropic virtual currency to award to a real world project according to one embodiment.

FIG. 5 is a screenshot of a social game where the player may choose how to award philanthropic virtual currency (3) (in the figure, the quantity "Joy") to award to a real world project according to one embodiment. The social game 104 provides the player 106 with a number of options (6) for real world projects 108 that the player 106 may spent PVC on. The options (6) include information about each of the projects 108 to assist the player 106 in their determination. The provided information may include, for example, a project title, a project image, a project supporter logo, and a short project summary. The options (6) further include a display of the amount (5) of PVC the player 106 has spent on each of the real world projects 108. The options (6) further include information about how close each real world project 108 is to being fully funded.

In addition to allowing players 106 to spend PVC on a real world project 108 as part of game play, social games 104 may also allow players 106 to purchase (9) philanthropic virtual goods (PVGs) as gifts for other players 106. The purchases of PVGs are one-for-one transactions in which the purchase of each PVG corresponds to the purchase of a real life good in the real world which will be donated to the real world project 108 in response to the purchase of the PVG. In some cases, the PVGs may affect game play for the recipient player 106.

An example of a PVG is the purchase of a "Virtual Vitamin Shop" in a social game 104. In response to purchasing the PVG, a package of vitamins is donated to a real world project 108 that provides services to children in need. Records of PVG purchases are maintained in a inventory controlled by a database that is part of the social gaming platform 102. Responsive to receiving a player 106 purchase request through the social gaming platform's 102 API, the social gaming platform 102 communicates with the affiliate responsible for the real world project 108 associated with the purchased gift to donate the real world good. Every PVG has a real world currency value and players 106 may purchase them in game using PVC, or more traditional such as social media credits (e.g. Facebook Credits), Paypal, Apple Store transactions, or credit card.

As with the expenditure of PVC, purchasing PVGs may also grant the purchasing player 106 or the receiving player 106 the ability to receive media associated with the PVG. For example, if the PVG is part of a real world project 108 to donate 50,000 pairs of shoes to needy children, upon purchasing the PVG the purchasing or recipient player 106 may receive video and photographs of the shoes being delivered.

Additional Considerations

The social gaming platform 102 may be implemented using a single computer, or a network of computers, including cloud-based computer implementations. The computers are preferably server class computers including one or more high-performance CPUs and 1 GB or more of main memory, as well as 500 GB to 2 TB of computer readable, persistent storage, and running an operating system such as LINUX or variants thereof. The operations of the social gaming platform 102 as described herein can be controlled through either hardware or through computer programs installed in computer storage and executed by the processors of such servers to perform the functions described herein. The social gaming platform 102 includes other hardware elements necessary for the operations described here, including network interfaces and protocols, input devices for data entry, and output devices for display, printing, or other presentations of data.

In this description, the terms "platform" when used in the context of aspects of the social gaming platform 102 refers to units of computational logic for providing the specified functionality. A computational logic can be implemented in hardware, firmware, and/or software. It will be understood that the social gaming platform 102 described herein represents one embodiment of the present invention. In addition, other embodiments may distribute the described functionality among a plurality of platforms in a different manner. Where the social gaming platform 102 described herein are implemented as software, it can be implemented as a standalone program, but can also be implemented through other means, for example as part of a larger program, as a plurality of separate programs, or as one or more statically or dynamically linked libraries. In any of these software implementations, the social gaming platform 102 is stored on computer readable persistent storage devices, loaded into memory, and executed by the one or more processors of one or more computers.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for funding a real world project based on social gaming in a social gaming computer system, the method comprising:

electronically sending, by a social gaming platform comprising a computer processor, information describing a particular real world project to a social gaming computer system, wherein the social gaming computer system is adapted to electronically distribute the information to players of a social game associated with the real world project, and provided by the social gaming computer system;

electronically sending, by the social gaming platform, virtual currency to the social gaming computer system, wherein the social gaming computer system is adapted to electronically distribute the virtual currency to the players of the social game;

electronically receiving, by the social gaming platform, funding requests from players of the social game, wherein each funding request designates an amount of virtual currency to be used for the real world project associated with the social game;

determining, using the computer processor of the social gaming platform, revenue generated in association with the social game, wherein the revenue is generated based at least on one of: a sale of virtual currency, a sale of a virtual good in connection with the social game, a sponsorship of the social game, or subscription fees received from players for playing the social game; and allocating, by the social gaming platform, at least a portion of the determined revenue to the real world project in proportion to a total amount of the virtual currency designated to be used for the real world project.

2. The computer-implemented method of claim 1, wherein the virtual currency is distributed to players of the social game based at least in part on one or more in-game actions performed by the players of the social game.

3. The computer-implemented method of claim 1, wherein the virtual currency is distributed to players of the social gaming computer system based at least in part on purchases performed by the players of the social game.

4. The computer-implemented method of claim 1, further comprising:
   determining that the particular real world project has met a threshold funding amount for the particular real world project; and
   electronically sending information to the social gaming computer system that the particular real world project has met the threshold funding amount for the real world project based on the determination.

5. The computer-implemented method of claim 1, wherein sending of the virtual currency to the social gaming computer system is performed responsive to a sale of the virtual currency in connection with the social gaming computer system.

6. The computer-implemented method of claim 1, further comprising:
   electronically receiving, from the social gaming computer system, information regarding a purchase of a virtual good by a player using the social gaming computer system, wherein the virtual good is associated with a real good and the particular real world project; and
   facilitating sending of the real good to an entity associated with the particular real world project for use in the real world project.

7. The computer-implemented method of claim 6, wherein facilitating the sending of the real good to the entity associated with particular real world project comprises performing a purchase order for the real good.

8. The computer-implemented method of claim 6, further comprising electronically sending, to the social gaming computer system, content describing delivery of the real good to the entity, wherein the social gaming computer system is adapted to electronically distribute the content describing the delivery to the players of the social game associated with the particular real world project.

9. The computer-implemented method of claim 1, wherein the information describing the particular real world project includes at least one of an image, video clip, or audio clip.

10. The computer-implemented method of claim 1, wherein the information describing the real world project includes at least a status of the real world project, a current funding level for the real world project, and a completion percentage for the real world project.

11. The computer-implemented method of claim 1, further comprising:
   electronically receiving, from the social gaming computer system, a request for a virtual currency value of an in-game user action performed in connection with the social game;
   determining the virtual currency value of the in-game user action; and
   electronically sending, to the social gaming computer system, the determined virtual currency value for the in-game user action.

12. A computer-implemented method for funding a real world project based on social gaming in one or more social gaming computer systems, the method comprising:
   electronically sending, by a social gaming platform comprising a computer processor, information describing one or more real world projects to one or more social gaming computer systems, wherein each social gaming computer system is adapted to electronically distribute the information to players of one or more social games provided by the one or more social gaming computer systems;
   electronically sending, by the social gaming platform, virtual currency to the one or more social gaming computer systems, wherein the social gaming computer systems are adapted to electronically distribute the virtual currency to the players of the one or more social games;
   electronically receiving, by the social gaming platform, funding requests from players of the one or more social games, wherein each funding request specifies a particular real world project from the one or more real world projects, and designates an amount of virtual currency of a player to be used for the particular real world project;
   determining, using a computer processor, revenue generated in association with the one or more social games, wherein the revenue is generated based at least in part on one of: a sale of virtual currency, a sale of a virtual good in connection with a social game, a sponsorship of a social game, or subscription fees received from players for playing a social game; and
   allocating, by the social gaming platform, the determined revenue to the real world projects, wherein each real world project is allocated a portion of the determined revenue in proportion to a total amount of virtual currency designated for the real world project by the funding requests.

13. The computer-implemented method of claim 12, wherein the virtual currency is distributed to players based at least in part on one or more in-game actions performed by the players.

14. The computer-implemented method of claim 12, wherein sending of the virtual currency to the social gaming computer systems is performed responsive to one or more sales of the virtual currency to the social gaming computer systems.

* * * * *